United States Patent
Shih et al.

(10) Patent No.: US 8,284,878 B2
(45) Date of Patent: Oct. 9, 2012

(54) RECEIVER FOR ECHO AND CROSSTALK CANCELLATION AND RECEIVING METHOD THEREOF

(75) Inventors: Chih-Yung Shih, Taipei (TW);
Liang-Wei Huang, Taipei (TW);
Shieh-Hsing Kuo, Taipei County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 871 days.

(21) Appl. No.: 12/398,186

(22) Filed: Mar. 5, 2009

(65) Prior Publication Data

US 2009/0225912 A1    Sep. 10, 2009

(30) Foreign Application Priority Data

Mar. 5, 2008  (TW) ................. 97107683 A

(51) Int. Cl.
*H03D 1/04* (2006.01)
(52) U.S. Cl. ......... 375/346; 375/254; 375/296; 375/348
(58) Field of Classification Search .................. 375/346, 375/254, 348, 396
See application file for complete search history.

(56) References Cited

U.S. PATENT DOCUMENTS

| 4,498,170 | A | 2/1985 | Noguchi |
| 6,009,178 | A | 12/1999 | Abel |
| 2003/0016770 | A1* | 1/2003 | Trans et al. ............... 375/346 |
| 2003/0086515 | A1 | 5/2003 | Trans |
| 2006/0062166 | A1 | 3/2006 | Jones |

* cited by examiner

*Primary Examiner* — Kabir A Timory
(74) *Attorney, Agent, or Firm* — Winston Hsu; Scott Margo

(57) ABSTRACT

A receiver for echo and crosstalk cancellation includes a level decision module, a digital-to-analog converter (DAC), an analog-to-digital converter (ADC) and a response module. The level decision module determines plural levels and plural level magnitudes according to an estimated signal to generate a first digital signal. The DAC converts the first digital signal into a first analog signal according to the levels and the level magnitudes. The ADC receives a first difference signal between the receiving signal and the first analog signal, and converts the first difference signal into a second digital signal. According to the first digital signal, the response module generates a response signal compensating the second digital signal to generate a back-end input signal.

23 Claims, 7 Drawing Sheets

RECEIVER FOR ECHO AND CROSSTALK CANCELLATION AND RECEIVING METHOD THEREOF

BACKGROUND OF THE INVENTION

1. Field of the Invention

The present invention relates to a receiver and related method, and more particularly to a receiver for echo and crosstalk cancellation and related receiving method.

2. Description of the Prior Art

In the existing wired network, a transceiver employs a hybrid circuit to exchange signals with external transmission wires. For example, the transceiver for realizing an Ethernet IEEE 802.3 local area network (LAN) protocol, set forth by the Institute of Electrical and Electronics Engineers, exchanges signals with four twisted pair wires. When the hybrid circuit transmits a signal, part of the signal was reflected to the transceiver, thereby causing so-called echo and crosstalk. Therefore, a typical transceiver needs a device to deal with echo and crosstalk problems.

Please refer to FIG. 1, which is a schematic diagram of a transceiver 10 according to the prior art. The transceiver 10 includes a hybrid circuit 12, a twisted pair wire 14, a local transmitter TX and a local receiver RX. Through the twisted pair wire 14, the transceiver 10 transmits and receives signals with a remote transceiver. The local transmitter TX includes a digital to analog converter for converting the signals from digital to analog form and outputting a transmission signal STX to the hybrid circuit 12. In general, the local transmitter TX operates with multiple transmission channels. The local receiver RX includes an analog to digital converter for converting a reception signal SRX from the hybrid circuit 12 from analog to digital form. The hybrid circuit 12 is utilized to split single signaling path of the twisted pair wire 14 into a receiving and a transmitting path. In addition, the hybrid circuit 12 is also used for diminishing the magnitude of the signals outputted by the local transmitter TX.

When the hybrid circuit 12 processes the transmission signal STX, part of the transmission signal STX couples to the reception signal SRX, or part of the transmission signal STX outputted to the twisted pair wire 14 is reflected to the local receiver RX due to resistance mismatch, thereby causing echo. Furthermore, the local transmitter TX is usually responsible for transmission of multiple channels. Crosstalk occurs in the local transmitter TX when a signal of a transmission channel couples to a signal of another transmission channel and further couples to reception signal SRX. In general, the local receiver RX utilizes an analog-to-digital converter (ADC) to receive the reception signal SRX, and is equipped with rough echo and crosstalk cancellation functions for converted signals. However, amplitude of the reception signal SRX possibly exceeds the acceptable receiving range of the ADC since echo and crosstalk can enlarge the amplitude of the reception signal SRX. In this situation, the reception signal SRX is clipped by the ADC, causing failure in echo and crosstalk estimation of the local receiver RX.

It is therefore an important objective to design a low-cost receiver capable of efficiently canceling echo and crosstalk.

SUMMARY OF THE INVENTION

The present invention therefore provides a receiver for echo and crosstalk cancellation and related receiving method that can diminish clipping distortion of a reception signal under an analog-to-digital conversion.

The present invention discloses a receiver for echo and crosstalk cancellation including a level decision module, a digital to analog converter (DAC), an analog to digital converter (ADC) and a response module. The level decision module receives an estimation signal and determines a plurality of levels and a plurality of level thresholds corresponding to the plurality of levels according to the estimation signal to generate a first digital signal. The DAC receives the first digital signal and converts the first digital signal into a first analog signal according to the plurality of levels and the plurality of level thresholds. The ADC receives a first difference signal corresponding to signal difference between a reception signal and the first analog signal and converts the first difference signal into a second digital signal. The response module receives the first digital signal and generates a response signal according to the first digital signal. The response signal compensates the second digital signal to generate a back-end input signal.

The present invention further discloses a receiving method for echo and crosstalk cancellation including determining a plurality of levels and a plurality of level thresholds corresponding to the plurality of levels according to an estimation signal, generating a first digital signal according to the plurality of levels and the estimation signal, converting the first digital signal into a first analog signal according to the plurality of levels and the plurality of level thresholds, converting a first difference signal corresponding to signal difference between a reception signal and the first analog signal into a second digital signal, and then generating a response signal for compensating the second digital signal according to the first digital signal so as to generate a back-end input signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
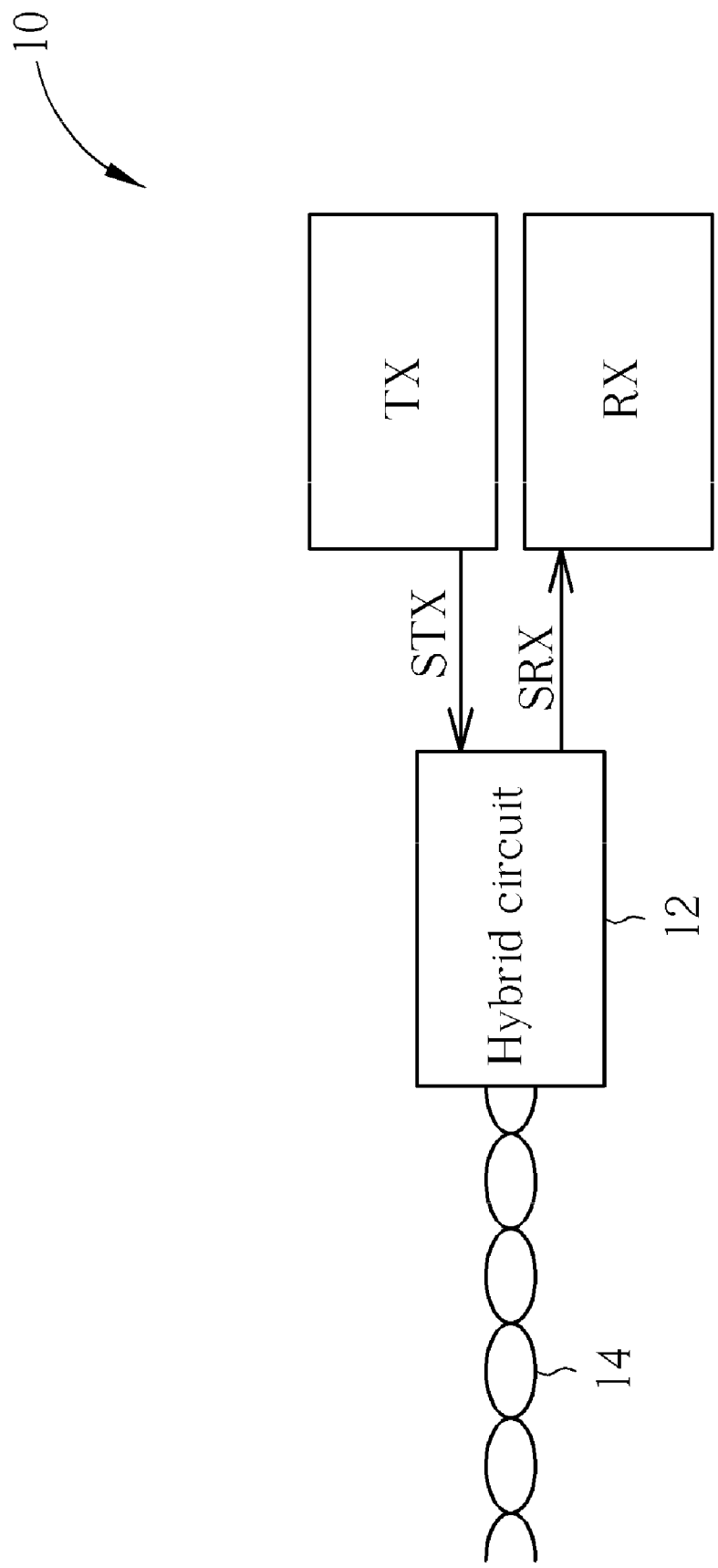
FIG. 1 is a schematic diagram of a transceiver according to the prior art.
Figure 2:
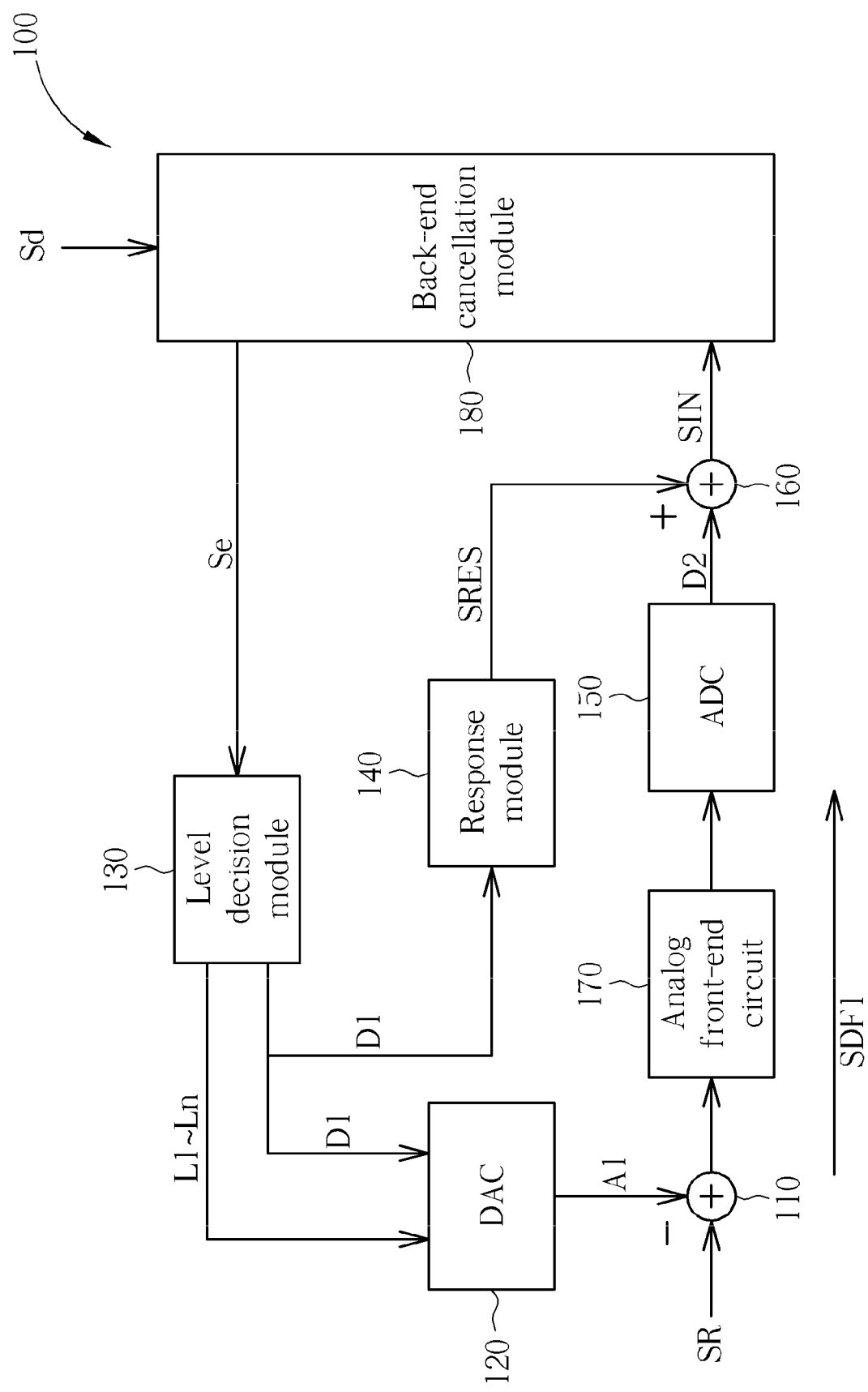
FIG. 2 is a schematic diagram of a receiver according to a first embodiment of the present invention.

Please refer to FIG. 2, which is a schematic diagram of a receiver 100 according to an embodiment of the present invention. The receiver 100 can be used as the local receiver RX in FIG. 1 and includes a subtracting circuit 110, a digital to analog converter (DAC) 120, a level decision module 130, a response module 140, an analog to digital converter (ADC) 150, an adding circuit 160, an analog front-end circuit 170 and a back-end cancellation module 180. The receiver 100 receives a reception signal SR, including components of the signal transmitted by a remote transceiver, an echo signal, and a crosstalk signal, from a hybrid circuit. The subtracting circuit 110 subtracts a first analog signal A1 from the reception signal SR. The analog front-end circuit 170 whose frequency response preferably acts as that of a low pass filter processes the subtracted reception signal SR outputted from the subtracting circuit 110. The DAC 120 is coupled to the subtracting circuit 110 and used for converting a first digital signal D1 into the first analog signal A1 according to the levels L1-Ln and a plurality of level thresholds corresponding to the levels L1-Ln, where n is an odd number. The level decision module 130 is coupled to the DAC 120 and used for determining the levels L1-Ln and related level thresholds according to an estimation signal Se to generate the first digital signal D1. The response module 140 is preferably an adaptive filter using an adaptive algorithm, such as a least mean square (LMS), a recursive least square (RLS), or a least square (LS) algorithm, and used for generating a response signal SRES according to the first digital signal D1. The ADC 150 is coupled to the analog front-end circuit 170 and used for receiving a first difference signal SDF1 corresponding to signal difference between the reception signal SR and the first analog signal A1 and converting the first difference signal SDF1 into a second digital signal D2. The adding circuit 160 is coupled to the response module 140 and the ADC 150 and used for adding the response signal SRES and the second digital signal D2 together to generate a back-end input signal SIN. The back-end cancellation module 180 is mainly used for estimating and canceling the echo and crosstalk signal components of the reception signal SR, and thereby generates the estimation signal Se according to a desired signal Sd and the back-end input signal SIN. The estimation signal Se is the estimation result of the echo and crosstalk signal components. In the receiver 100, the response signal compensates the second digital signal to generate a back-end input signal.

The response module 140 is preferably an adaptive filter using an adaptive algorithm, such as a least mean square (LMS) algorithm, a recursive least square (RLS) algorithm or a least square (LS) algorithm, and generates a response signal SRES according to the first digital signal D1. The ADC 150 is coupled to the analog front-end circuit 170 and used for receiving a first difference signal SDF1 obtained by subtracting the first analog signal Al from the reception signal SR. The first difference signal SDF1 undergoes process of the analog front-end circuit 170 and is then converted to a second digital signal D2. The adder circuit 160 is coupled to the response module 140 and the ADC 150 and used for adding the response signal SRES and the second digital signal D2 together to generate a back-end input signal SIN. The back-end cancellation module 180 mainly functions to estimate and cancel the echo and crosstalk components of the reception signal SR. The back-end cancellation module 180 generates the estimation signal Se according to a desired signal Sd and the back-end input signal SIN, where the estimation signal Se is an estimating result of the echo and crosstalk components.

In the receiving device 100, the level decision module 130 can determine the number of the levels L1-Ln and related level threshold according to a statistical distributing range of the estimation signal Se, so as to control the DAC 120 properly. The response module 140 generates the response signal SRES, similar to the first analog signal A1 in magnitude, according to an impulse response of a signal path between the subtracting circuit 110 and the adder circuit 160. By subtracting the first analog signal Al, a maximum magnitude of the reception signal SR can be reduced to be within the acceptable input range of the ADC 150. Thus, the reception signal SR is not clipped as processed by the ADC 150. Furthermore, the receiving device 100 can compensate the pre-subtracting signal component by adding the response signal SRES to the second digital signal D2. In other words, the receiving device 100 condenses the magnitude of the reception signal SR under the analog domain according to the estimated echo and crosstalk components as well as the estimation signal Se, and further performs signal compensation to generate the back-end input signal SIN under the digital domain after analog-to-digital conversion. In this situation, the back-end cancellation module 180 is allowed to estimate and cancel the echo and crosstalk components with a substantially complete input signal. Therefore, it is unnecessary for the receiving device 100 of the present invention to employ an ADC with a large input range and a high resolution.

Figure 3:
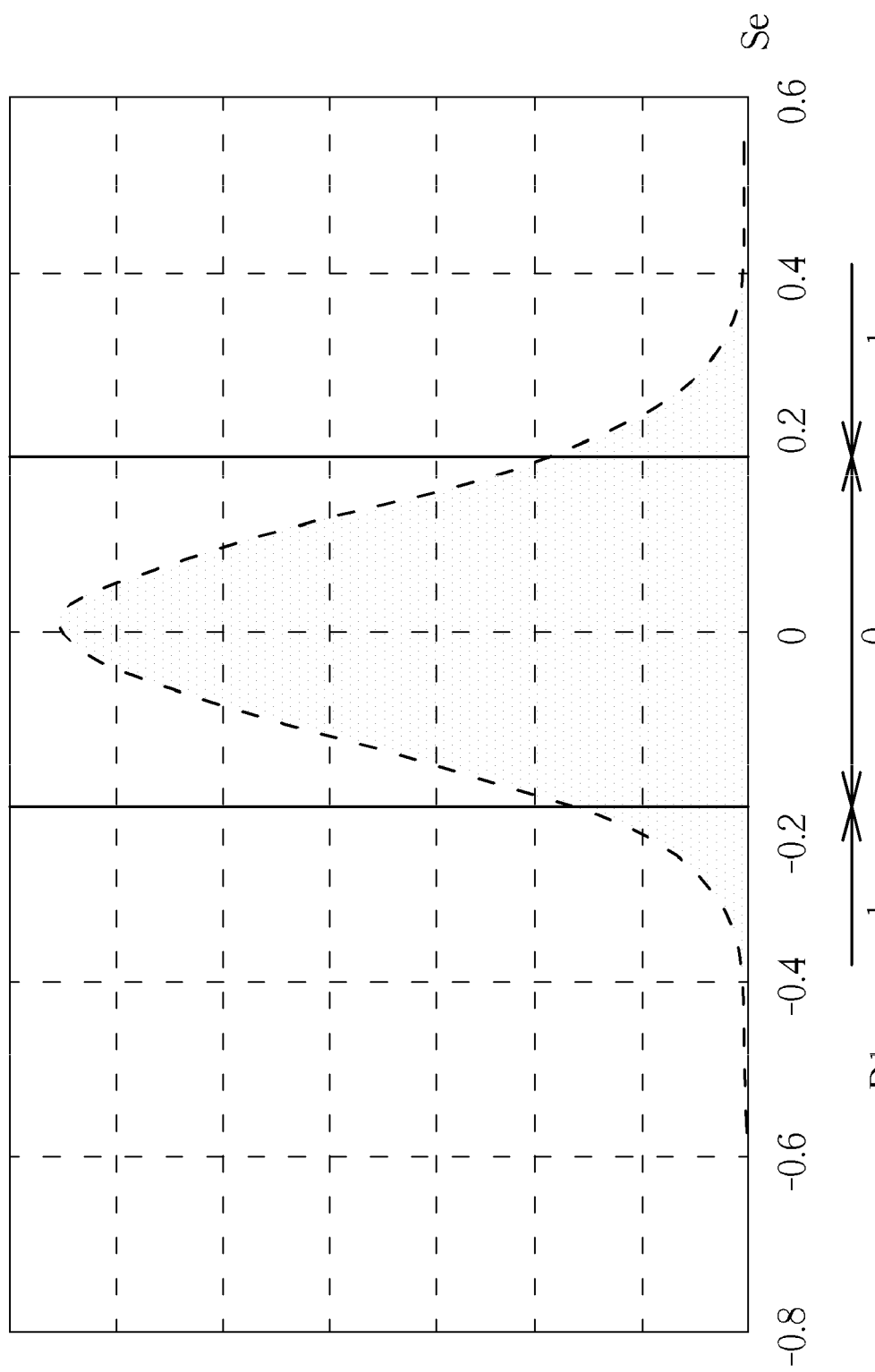
FIG. 3 is a schematic diagram of signal level distribution of an estimation signal according to FIG. 2.

The description below is used for clearer explanation operating principles of the embodiment more clearly. Please refer to FIG. 3, which is a distributing diagram of the estimation signal Se according to FIG. 2. FIG. 3 reveals that samples of the estimation signal Se falls within a range from the level of +0.6 to −0.6, and most of the samples locate between the levels +0.2 and −0.2. Assuming that the DAC 120 adopts three levels for FIG. 3, operations of the level decision module 130 and the DAC 120 are realized by the following formulas:

the level threshold values=$K \times (0.6/3)=0.2 \times K$, where $K=+1$ or $-1$;

the first digital signal D1=1, if the estimation signal $Se > 0.2$;

the first digital signal $D1=0$, if $-0.2 <=$ the estimation signal $Se <= +0.2$;

the first digital signal $D1=-1$, if the estimation signal $Se < -0.2$;

the first analog signal $A1=(0.6 \times 2)/3=0.4$ volt, if the first digital signal $D1=1$;

the first analog signal A1=0 volt, if the first digital signal D1=0; and the first analog signal $A1=(0.6 \times 2)/3=-0.4$ volt, if the first digital signal $D1=-1$.

Figure 4:
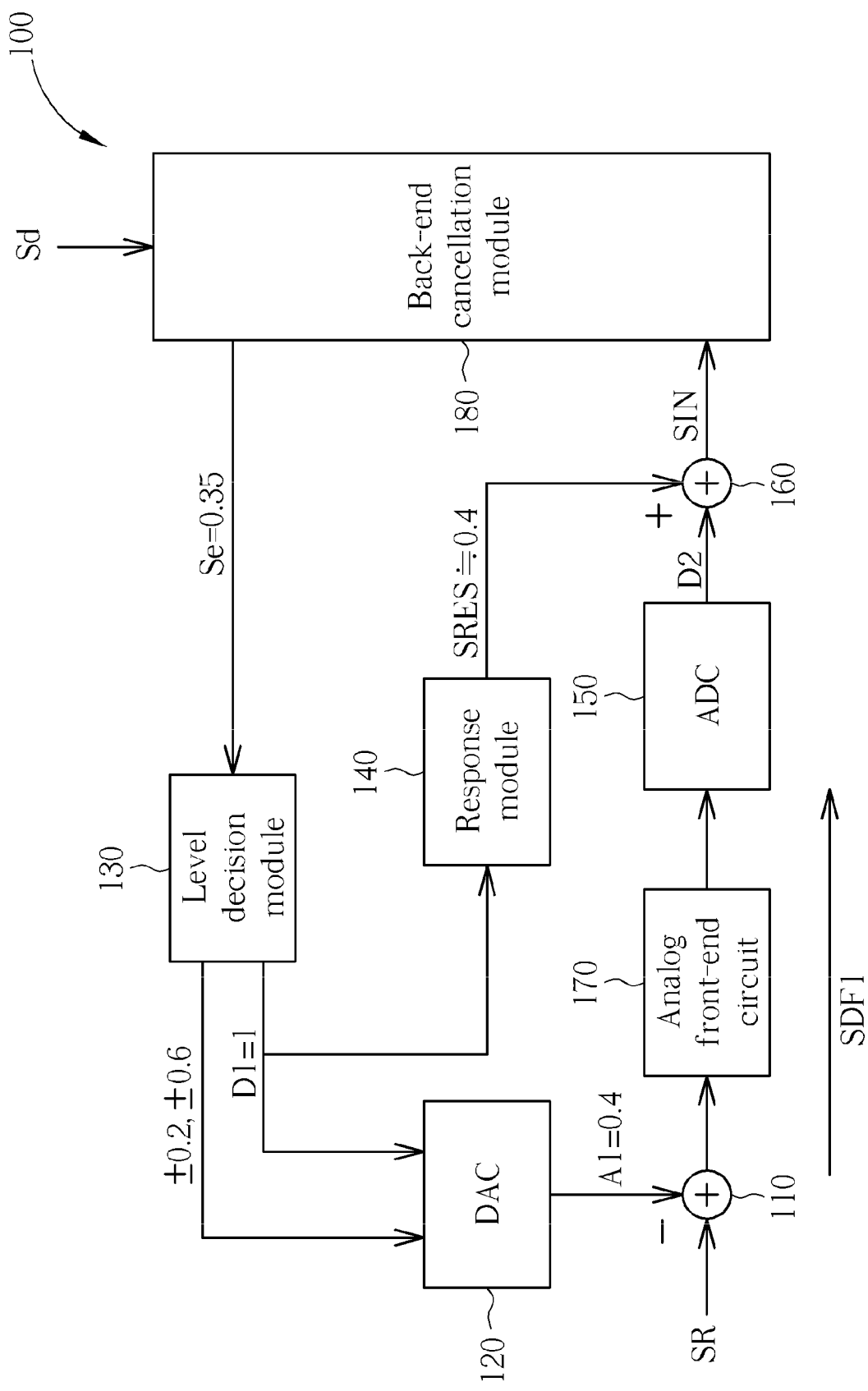
FIG. 4 is a schematic diagram of the receiving device 100 operating with the estimation signal Se of 0.35 according to FIGS. 2 and 3.

Through the above formulas, the receiving device 100 controls the reception signal SR within the specific range. Please refer to FIG. 4, which is a schematic diagram of the receiving device 100 operating with the estimation signal Se of 0.35. The receiving device 100 of FIG. 4 adopts the operating principles of FIG. 3 and related formulas. First, the reception signal SR is subtracted by 0.4 as passing through the subtracting circuit 110. The response module 140 then outputs the response signal SRES approximating to 0.4 according to the impulse response of a signal path between the subtracting circuit 110 and the adder circuit 160. Finally, the adder circuit 160 adds the response signal SRES and the second digital signal D2 together for signal compensation.

Please note that the abovementioned embodiment aims to clarify the scopes of the present invention. Therefore, those skills in the art can select appropriate the number of the levels and related level thresholds and do corresponding modification on settings of the DAC 120.

Figure 5:
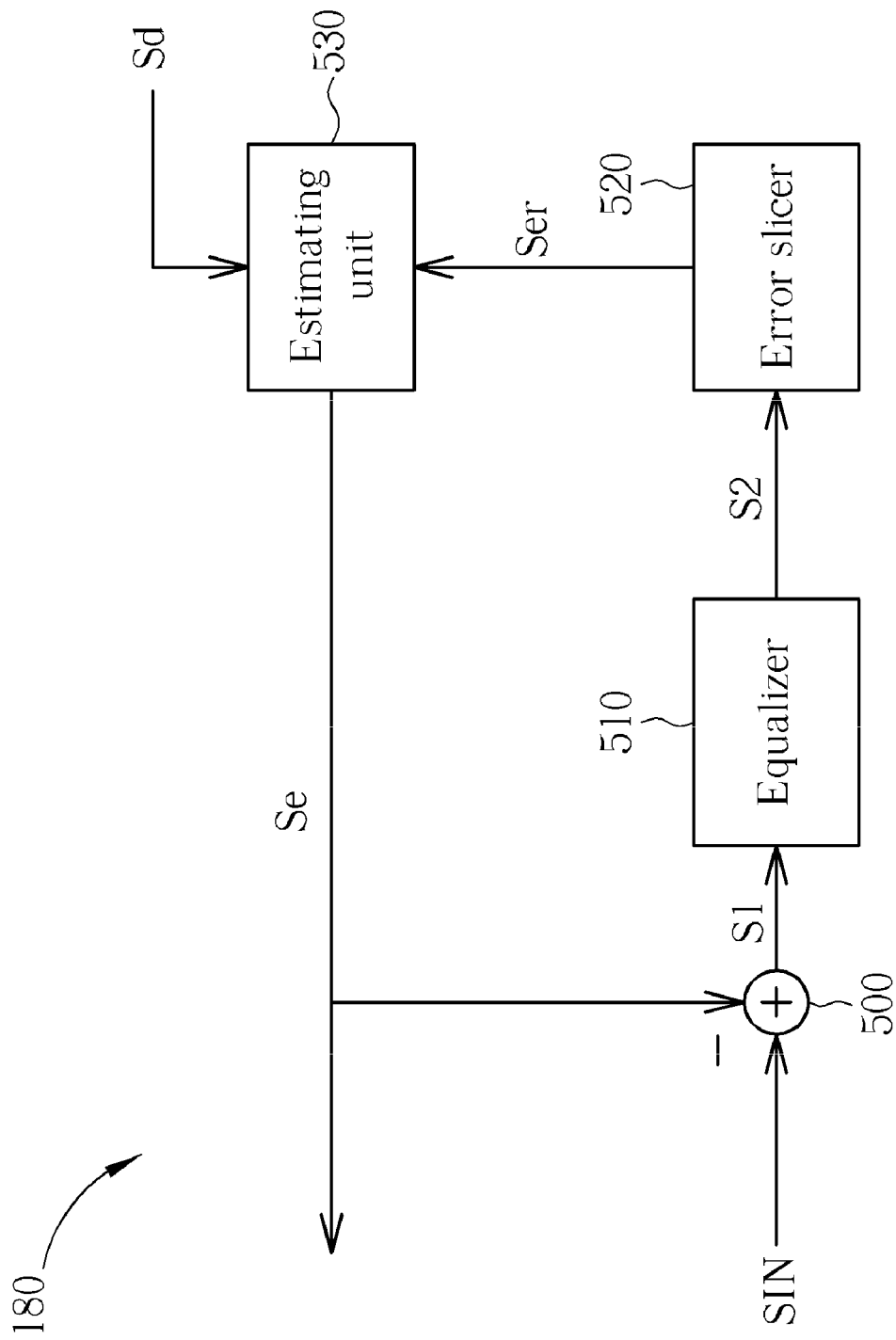
FIG. 5 is a schematic diagram of the back-end cancellation module of FIG. 2 according to an exemplary embodiment of the present invention.

Please refer to FIG. 5, which is a schematic diagram of the back-end cancellation module 180 of FIG. 2 according to an exemplary embodiment of the present invention. The back-end cancellation module 180 includes a subtracting circuit 500, an equalizer 510, an error slicer 520 and an estimating unit 530. The subtracting circuit 500 subtracts the estimation signal Se from the back-end input signal SIN to generate a second difference signal S1. The equalizer 510 equalizes the second difference signal S1 to generate a first signal S2. The error slicer 520 slices the first signal S2 according to a predetermined threshold to generate an error signal Ser. For example, assuming that a perfect reception signal has possibilities of +1 and −1, the error signal Ser turns out 0.2 when the first signal S2 is generated at 1.2. The error signal Ser is outputted at −0.2 when the first signal S2 is inputted at −1.2. The error signal Ser is obtained by −0.2 when the first signal S2 is 0.8. The estimating unit 530 is preferably an adaptive filter using an adaptive algorithm, preferably a MMSE (minimum mean square error) algorithm, and generates the estimation signal Se according to the error signal Ser and the desired signal Sd. When the local receiver RX of FIG. 1 employs the receiving device 100, the desired signal Sd is provided by the local transmitter TX of FIG. 1.

Figure 6:
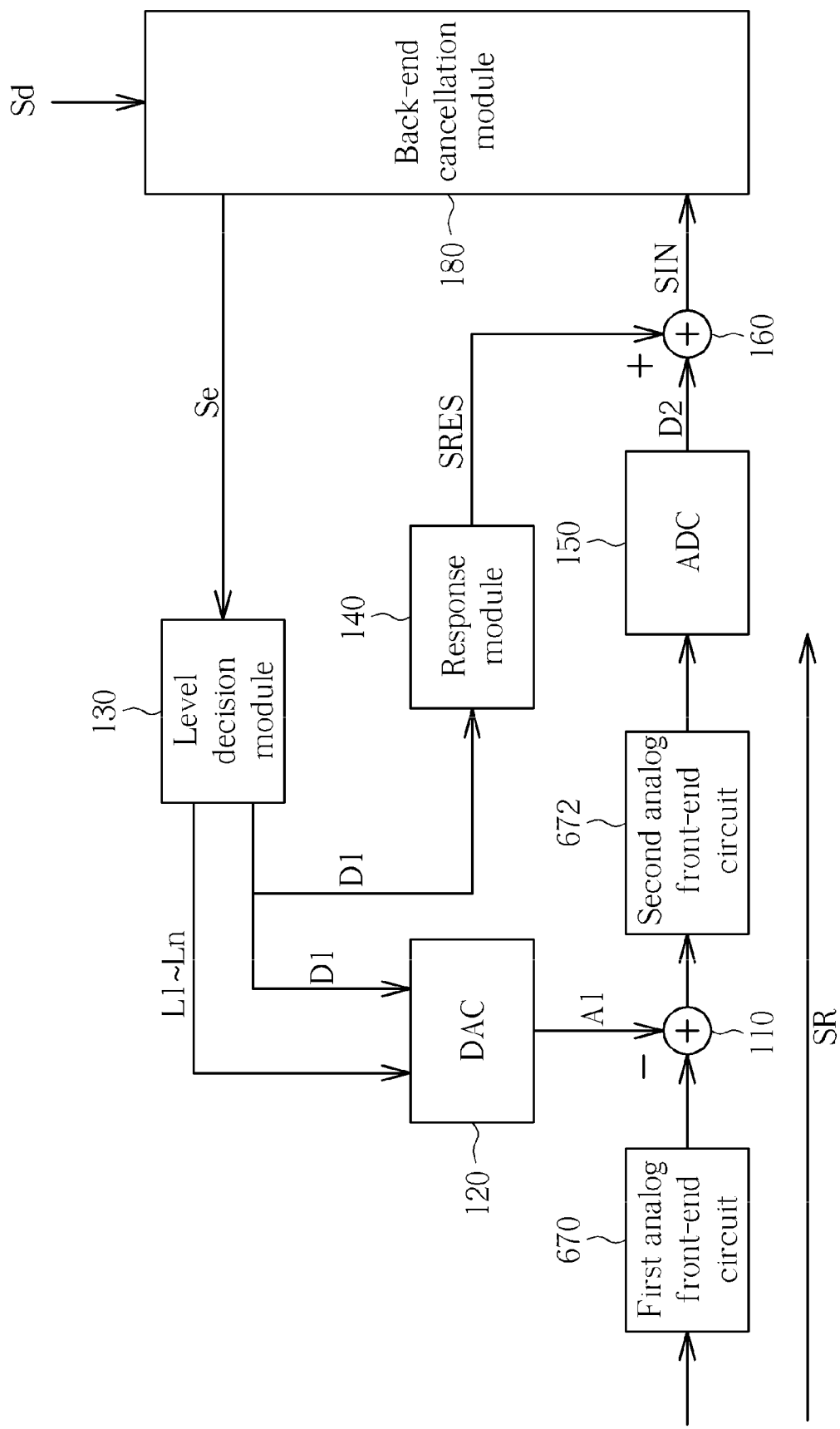
FIG. 6 is a schematic diagram of a receiving device according to a second embodiment of the present invention.
Figure 7:
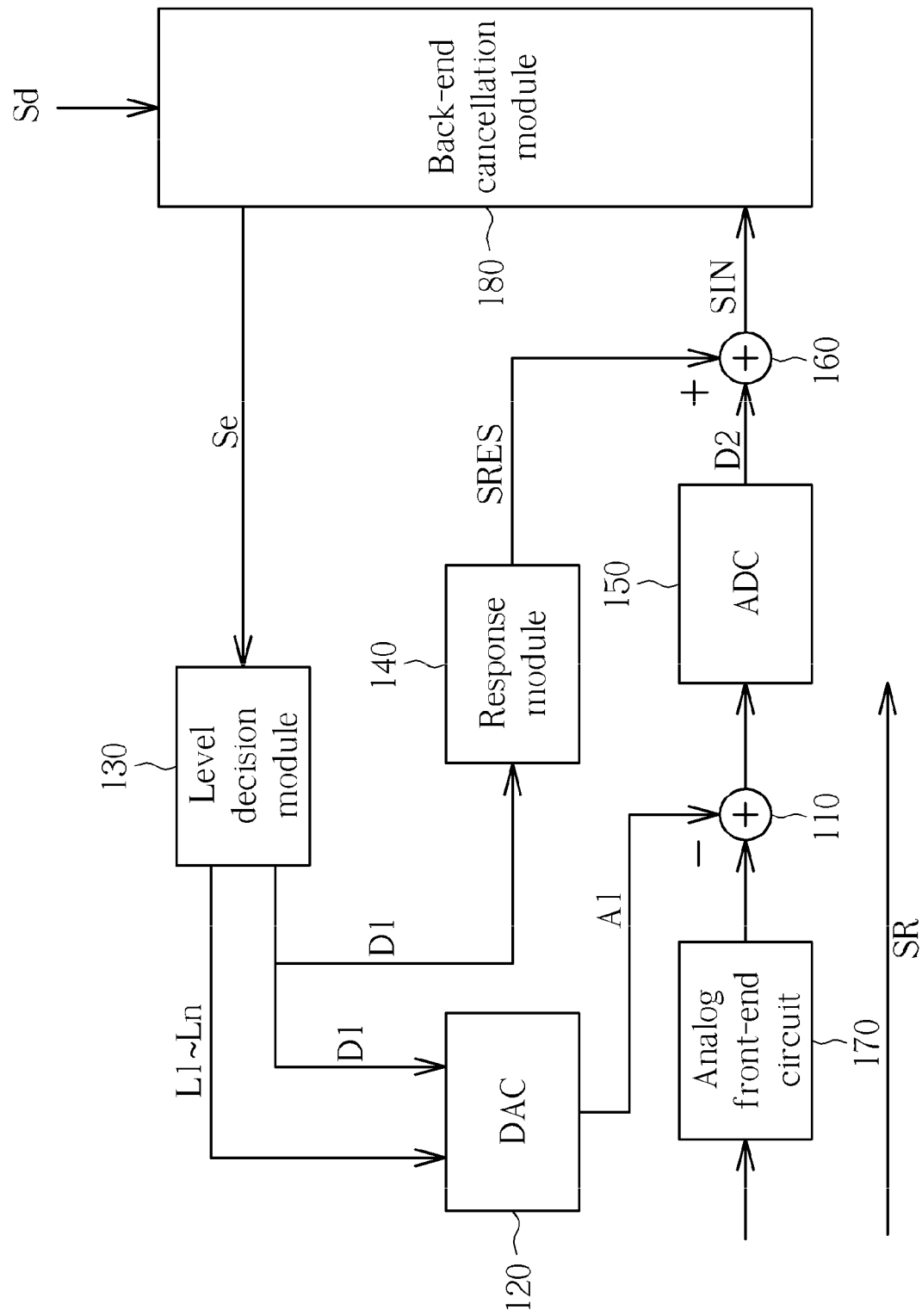
FIG. 7 is a schematic diagram of a receiving device according to a third embodiment of the present invention.

Please note that, in the receiving device 100, the subtracting circuit 110 is limited to be installed at a front end of the ADC 150, and not at a front end of the analog front-end circuit 170. The analog front-end circuit 170 usually includes various signal processing devices, and thus the subtracting circuit 110 can be installed between those devices. Please refer to FIG. 6, which is a schematic diagram of a receiving device 600 according to a second embodiment of the present invention. All elements of FIG. 2, other than the analog front-end circuit 170, are the same as those in the receiving device 600. In addition, the receiving device 600 includes a first analog front-end circuit 670 and a second analog front-end circuit 672, which are seen as two split parts of the analog front-end circuit 170 of FIG. 2. In FIG. 6, the subtracting circuit 110 is installed between the first analog front-end circuit 670 and the second analog front-end circuit 672. In this situation, the response module 140 generates the response signal SRES whose magnitude approximates to the first analog signal A1 according to an impulse response of a signal path between the subtracting circuit 110 and the adder circuit 160 as well as an impulse response of the second analog front-end circuit 672. Please refer to FIG. 7, which is a schematic diagram of a receiving device 700 according to a third embodiment of the present invention. Similar to the receiving device 600, architecture of the receiving device 700 is almost identical with the receiving device 100, and the only difference is that locations of the subtracting circuit 110 and the analog front-end circuit 170 are swapped. In conclusion, the receiving device of the embodiments of the present invention employs an ADC to cooperate with the back-end cancellation module for echo and crosstalk cancellation. Furthermore, the receiving device adjusts the maximum magnitude of the reception signal to fit the acceptable input range of the ADC and then compensate the output signals of the ADC. Thus, the present invention can efficiently diminish signal distortion due to clipping with a lower-resolution ADC.

Those skilled in the art will readily observe that numerous modifications and alterations of the device and method may be made while retaining the teachings of the invention.

What is claimed is:

1. A receiver for echo and crosstalk cancellation comprising:
    a level decision module for receiving an estimation signal and determining a plurality of levels and a plurality of level thresholds corresponding to the plurality of levels according to the estimation signal to generate a first digital signal;
    a digital to analog converter for receiving the first digital signal and converting the first digital signal into a first analog signal according to the plurality of levels and the plurality of level thresholds;
    an analog to digital converter for receiving a first difference signal corresponding to signal difference between a reception signal and the first analog signal and converting the first difference signal into a second digital signal;
    a subtracting circuit, coupled to the digital to analog converter and the analog to digital converter, for generating the first difference signal corresponding to the signal difference between the reception signal and the first analog signal by subtracting the first analog signal, which is generated by the digital to analog converter, from the reception signal; and
    a response module for receiving the first digital signal and generating a response signal according to the first digital signal;
    wherein the response signal compensates the second digital signal to generate a back-end input signal.

2. The receiver of claim 1, wherein the reception signal is generated by a hybrid circuit.

3. The receiver of claim 1, wherein the response module is an adaptive filter adopting an adaptive algorithm.

4. The receiver of claim 3, wherein the adaptive algorithm is a least mean square (LMS) algorithm, a recursive least square (RLS) algorithm or a least square (LS) algorithm.

5. The receiver of claim 1, wherein the first difference signal is further processed by a first analog front-end circuit.

6. The receiver of claim 5, wherein the signal process of the first analog front-end circuit comprises at least a process of signal amplifying and signal filtering.

7. The receiver of claim 1 further comprising a back-end cancellation module for receiving the back-end input signal and generating the estimation signal according to a desired signal and the back-end input signal.

8. The receiver of claim 7, wherein the back-end cancellation module comprises:
    an equalizer for receiving a second difference signal corresponding to signal difference between the estimation signal and the back-end input signal and equalizing the second difference signal to generate a first signal;
    an error slicer for receiving a first signal and slicing the first signal to generate an error signal; and
    an estimating unit for receiving the error signal and the desired signal and generating the estimation signal according to the error signal and the desired signal.

9. The receiver of claim 8, wherein the estimating unit is an adaptive filter adopting an adaptive algorithm.

10. The receiver of claim 9, wherein the adaptive algorithm is a least mean square (LMS) algorithm, a recursive least square (RLS) algorithm or a least square (LS) algorithm.

11. The receiver of claim 1, wherein the number of the plurality of levels is odd.

12. The receiver of claim 1, wherein the reception signal is further processed by a second front-end circuit.

13. The receiver of claim 12, wherein the signal process of the second analog front-end circuit comprises at least one of signal amplifying and signal filtering.

14. A receiving method for echo and crosstalk cancellation comprising:
    determining a plurality of levels and a plurality of level thresholds corresponding to the plurality of levels according to an estimation signal;
    generating a first digital signal according to the plurality of levels and the estimation signal;
    using a digital to analog converter to convert the first digital signal into a first analog signal according to the plurality of levels and the plurality of level thresholds;

converting a first difference signal corresponding to signal difference between a reception signal and the first analog signal into a second digital signal; generating the first difference signal corresponding to the signal difference between the reception signal and the first analog signal by subtracting the first analog signal, which is generated by the digital to analog converter, from the reception signal; and generating a response signal for compensating the second digital signal according to the first digital signal so as to generate a back-end input signal.

15. The receiving method of claim 14, wherein the reception signal is generated by a hybrid circuit.

16. The receiving method of claim 14, wherein generating the response signal for compensating the second digital signal according to the first digital signal comprises:

providing an adaptive filter adopting an adaptive algorithm; and receiving the first digital signal through the adaptive filter to generate the response signal.

17. The receiving method of claim 16, wherein the adaptive algorithm is a least mean square (LMS) algorithm, a recursive least square (RLS) algorithm or a least square (LS) algorithm.

18. The receiving method of claim 14 further comprising:

generating an error signal according to a second difference signal corresponding to difference between the back-end input signal and the estimation signal; and generating the estimation signal according to the error signal and a desired signal.

19. The receiving method of claim 18, wherein generating the estimation signal comprises:

providing an adaptive filter adopting an adaptive algorithm; and receiving the error signal and the desired signal through the adaptive filter to generate the estimation signal.

20. The receiving method of claim 19, wherein the adaptive algorithm is a minimum mean square error (MMSE) algorithm, a recursive least square (RLS) algorithm or a least square (LS) algorithm.

21. The receiving method of claim 14 further comprising:

performing at least one of an amplifying process and a filtering process on the reception signal.

22. The receiving method of claim 14 further comprising:

performing at least one of an amplifying process and a filtering process on the first difference signal.

23. The receiving method of claim 14, wherein the number of the plurality of levels is odd.

* * * * *